United States Patent
Yamauchi et al.

(10) Patent No.: US 7,749,133 B2
(45) Date of Patent: Jul. 6, 2010

(54) DRIVING DEVICE AND POWER OUTPUT APPARATUS EQUIPPED WITH DRIVING DEVICE

(75) Inventors: Tomokazu Yamauchi, Toyota (JP); Shoichi Sasaki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 573 days.

(21) Appl. No.: 11/883,567

(22) PCT Filed: Aug. 30, 2006

(86) PCT No.: PCT/JP2006/317118

§ 371 (c)(1),
(2), (4) Date: Aug. 2, 2007

(87) PCT Pub. No.: WO2007/026769

PCT Pub. Date: Mar. 8, 2007

(65) Prior Publication Data

US 2008/0150382 A1 Jun. 26, 2008

(30) Foreign Application Priority Data

Aug. 31, 2005 (JP) ............................. 2005-251842

(51) Int. Cl.
*B60W 10/02* (2006.01)
*B60W 10/08* (2006.01)
(52) U.S. Cl. .......................................... 477/8; 475/151
(58) Field of Classification Search .................. 475/151, 475/153, 208; 477/3, 5, 6, 7, 8, 15, 174
See application file for complete search history.

(56) References Cited

U.S. PATENT DOCUMENTS

| 5,675,203 | A | * | 10/1997 | Schulze et al. ............... 310/113 |
| 7,549,939 | B2 | * | 6/2009 | Strauss et al. ................... 475/5 |
| 7,591,748 | B2 | * | 9/2009 | Holmes ......................... 475/5 |
| 2003/0224892 | A1 | * | 12/2003 | Yamauchi et al. ............... 475/5 |

(Continued)

FOREIGN PATENT DOCUMENTS

JP     A 2000-289476     10/2000

(Continued)

*Primary Examiner*—Sherry L Estremsky
*Assistant Examiner*—Edwin A. Young
(74) *Attorney, Agent, or Firm*—Oliff & Berridge, PLC (57) ABSTRACT

A driving device of the invention has a clutch 40 and a continuously variable transmission 50. The clutch 40 couples and decouples a rotating shaft 24 or an output shaft of a motor 30 with and from a driveshaft 22. The continuously variable transmission 50 has an input shaft connected to the rotating shaft 24 and an output shaft connected to the driveshaft 22 via a gear mechanism 52. A spring 36 is attached to a rotor 31 of the motor 30 to apply a pressing force and cause the clutch 40 to couple the rotating shaft 24 with the driveshaft 22 in response to a relatively small output torque of the motor 30. With an increase in output torque of the motor 30, a thrust force produced in the motor 30 moves the rotating shaft 24 against the pressing force of the spring 36 to cause the clutch 40 to decouple the rotating shaft 24 from the driveshaft 22. The output torque of the motor 30 is then transmitted to the driveshaft 22 with a gear change of the continuously variable transmission 50.

15 Claims, 4 Drawing Sheets

U.S. PATENT DOCUMENTS

| | | | |
|---|---|---|---|
| 2004/0147355 A1 | 7/2004 | Grundl et al. | |
| 2005/0098365 A1 | 5/2005 | Hanyu et al. | |

FOREIGN PATENT DOCUMENTS

| | | |
|---|---|---|
| JP | A 2001-287556 | 10/2001 |
| JP | A 2002-364556 | 12/2002 |
| JP | A 2003-267076 | 9/2003 |
| JP | A 2004-122878 | 4/2004 |
| JP | A 2004-526915 | 9/2004 |
| JP | A 2005-145145 | 6/2005 |

* cited by examiner

DRIVING DEVICE AND POWER OUTPUT APPARATUS EQUIPPED WITH DRIVING DEVICE

TECHNICAL FIELD

The present invention relates to a driving device and a power output apparatus equipped with a driving device. More specifically the invention pertains to a driving device that outputs driving force to a driveshaft, as well as to a power output apparatus equipped with such a driving device.

BACKGROUND ART

One proposed structure of a driving device includes a motor, a transmission, a first coupling mechanism for coupling a rotating shaft of the motor with an input shaft of the transmission and releasing the coupling, a second coupling mechanism for coupling the rotating shaft of the motor with a driveshaft and releasing the coupling, and a third coupling mechanism for coupling an output shaft of the transmission with the driveshaft and releasing the coupling (see, for example, Patent Document 1). In this prior art driving device, the power transmission pathway is switched over between power transmission of the output power of the motor to the driveshaft via the transmission in the coupled conditions of the first coupling mechanism and the third coupling mechanism and in the released condition of the second coupling mechanism and direct transmission of the output power of the motor to the driveshaft in the released conditions of the first coupling mechanism and the third coupling mechanism and in the coupled condition of the second coupling mechanism.

Patent Document 1: Japanese Patent Laid-Open Gazette No. 2005-145145

DISCLOSURE OF THE INVENTION

The driving device of the above structure requires the three different coupling mechanisms. For the smooth connection and release by these three coupling mechanisms, this prior art driving device undesirably has a complicated structure and requires highly accurate control.

An object of the present invention is to provide a driving device and a power output apparatus equipped with a driving device, which attain a switchover of power transmission pathway from a motor to a driveshaft with a simple structure. Another object of the invention is to provide a driving device of the invention and a power output apparatus equipped with a driving device, which attains a smooth switchover of power transmission pathway from the motor to the driveshaft without any complicated control.

In order to achieve at least part of the above objects, a driving device and a power output apparatus equipped with a driving device of the invention are constructed as follows.

According to one aspect, the present invention is directed to a driving device that outputs driving force to a driveshaft. The driving device includes: a motor including a stator that has a coil wound thereon, and a rotor that is attached to a rotating shaft pivotally supported to be movable in an axial direction and rotates with a moving force of moving the rotating shaft in one specific direction by function of a magnetic field generated by application of electric current onto the coil of the stator; a first power transmission mechanism that transmits power from the rotating shaft to the driveshaft; a second power transmission mechanism that is different from the first power transmission mechanism and transmits power from the rotating shaft to the driveshaft; and a power transmission switchover module that, in response to a motion of the rotating shaft in the axial direction, switches over a power transmission pathway between the power transmission by the first power transmission mechanism and the power transmission by the second power transmission mechanism.

In the driving device of the invention, the rotor of the motor is attached to the rotating shaft that is pivotally supported to be movable in the axial direction. The motor outputs power to the rotating shaft with the moving force of moving the rotating shaft in the specific direction by the function of the magnetic field generated by application of electric current to the coil of the stator. In response to a motion of the rotating shaft in the axial direction, the power transmission switchover module switches over the power transmission pathway between the power transmission from the rotating shaft to the driveshaft by the first power transmission mechanism and the power transmission from the rotating shaft to the driveshaft by the second power transmission mechanism. Namely the power transmission pathway is switched over between the power transmission by the first power transmission mechanism and the power transmission by the second power transmission mechanism according to the driving force output from the motor and the resulting motion of the rotating shaft in the axial direction. The driving device of the invention has this simple structure for the switchover of the power transmission pathway without requiring several coupling mechanisms unlike the prior art driving device. The driving device of the invention also does not require any complicated control of the several coupling mechanisms for the smooth coupling and release. The driving device of the invention thus effectively attains a smooth switchover of the power transmission without any complicated control.

In one aspect of the driving device of the invention, the power transmission switchover module switches over the power transmission pathway to the power transmission by the first power transmission mechanism in a low torque region where an output torque of the motor is less than a preset first reference torque. The power transmission switchover module switches over the power transmission pathway to the power transmission by the second power transmission mechanism in a high torque region where the output torque of the motor is not less than a preset second reference torque that is not lower than the preset first reference torque. In the driving device of this arrangement, the first power transmission mechanism is favorably activated for the power transmission in the low torque region, whereas the second power transmission mechanism is favorably activated for the power transmission in the high torque region. The motor is thus operable in its adequate driving range.

In one preferable embodiment of the driving device of the invention, the power transmission switchover module includes: a moving force application structure that applies a moving force to the rotating shaft in an opposite direction reverse to the specific direction; and a coupling-decoupling structure that couples the rotating shaft with the driveshaft in response to a motion of the rotating shaft in the specific direction and decouples the rotating shaft from the driveshaft in response to a motion of the rotating shaft in the opposite direction. In response to output of a relatively small torque from the motor, the moving force applied to the rotating shaft in the opposite direction by the moving force application structure causes the coupling-decoupling structure to couple the rotating shaft with the driveshaft. The first power transmission mechanism is then activated to transmit the output power of the motor to the driveshaft. In response to output of a relatively large torque from the motor, on the other hand, the moving force of the rotating shaft in the specific direction by the function of the magnetic field generated in the motor causes the coupling-decoupling structure to decouple the rotating shaft from the driveshaft. The second power transmission mechanism is then activated to transmit the output power of the motor to the driveshaft. In the driving device of this arrangement, by simply varying the output torque of the motor, the power transmission pathway is readily switched over between the power transmission by the first power transmission mechanism and the power transmission by the second power transmission mechanism. The moving force application structure may be, for example, a spring that applies a pressing force to the rotating shaft in the opposite direction.

In another aspect of the driving device of the invention, the first power transmission mechanism transmits the power from the rotating shaft to the driveshaft at a fixed gear ratio, and the second power transmission mechanism transmits the power from the rotating shaft to the driveshaft at a variable gear ratio. This arrangement enables the power transmission at the fixed gear ratio by the first power transmission mechanism, while enabling the power transmission at the variable gear ratio by the second power transmission mechanism. In the driving device of this arrangement, the second power transmission mechanism may have a continuously variable transmission, may have a multi-step transmission, or may have a torque converter. In the last structure with the torque converter, the second power transmission mechanism may additionally have a transmission located between the torque converter and the driveshaft.

In the driving device of the invention having the above arrangement where the second power transmission mechanism transmits the power from the rotating shaft to the driveshaft at the variable gear ratio, the driving device may further have a control module that, in a coupling state of the rotating shaft with the driveshaft by the coupling-decoupling structure, controls the second power transmission mechanism to cause rotation of the driveshaft relative to rotation of the rotating shaft with the power transmission by the second power transmission structure to be in synchronism with the rotation of the driveshaft relative to the rotation of the rotating shaft with the power transmission by the first power transmission structure. The driving device of this arrangement does not require separation of the second power transmission mechanism during the power transmission by the first power transmission mechanism. This arrangement thus ensures a smooth switchover of the power transmission pathway from the power transmission by the first power transmission mechanism to the power transmission by the second power transmission mechanism.

According to another aspect, the present invention is directed to a power output apparatus that outputs power to a driveshaft. The power output apparatus includes: a motor including a stator that has a coil wound thereon, and a rotor that is attached to a rotating shaft pivotally supported to be movable in an axial direction and rotates with a moving force of moving the rotating shaft in one specific direction by function of a magnetic field generated by application of electric current onto the coil of the stator; a first power transmission mechanism that transmits power from the rotating shaft to the driveshaft; a second power transmission mechanism that is different from the first power transmission mechanism and transmits power from the rotating shaft to the driveshaft; a power transmission switchover module that, in response to a motion of the rotating shaft in the axial direction, switches over a power transmission pathway between the power transmission by the first power transmission mechanism and the power transmission by the second power transmission mechanism; an internal combustion engine; and an electric power mechanical power input output assembly that is connected to an output shaft of the internal combustion engine and to the driveshaft and outputs at least part of power generated by the internal combustion engine to the driveshaft through input and output of electric power and mechanical power.

In the power output apparatus of the invention, the rotor of the motor is attached to the rotating shaft that is pivotally supported to be movable in the axial direction. The motor outputs power to the rotating shaft with the moving force of moving the rotating shaft in the specific direction by the function of the magnetic field generated by application of electric current to the coil of the stator. In response to a motion of the rotating shaft in the axial direction, the power transmission switchover module switches over the power transmission pathway between the power transmission from the rotating shaft to the driveshaft by the first power transmission mechanism and the power transmission from the rotating shaft to the driveshaft by the second power transmission mechanism. Namely the power transmission pathway is switched over between the power transmission by the first power transmission mechanism and the power transmission by the second power transmission mechanism according to the driving force output from the motor and the resulting motion of the rotating shaft in the axial direction. The power output apparatus of the invention has this simple structure for the switchover of the power transmission pathway without requiring several coupling mechanisms unlike the prior art power output apparatus. The power output apparatus of the invention also does not require any complicated control of the several coupling mechanisms for the smooth coupling and release. The power output apparatus of the invention thus effectively attains a smooth switchover of the power transmission without any complicated control.

In one aspect of the power output apparatus of the invention, the power transmission switchover module switches over the power transmission pathway to the power transmission by the first power transmission mechanism in a low torque region where an output torque of the motor is less than a preset first reference torque. The power transmission switchover module switches over the power transmission pathway to the power transmission by the second power transmission mechanism in a high torque region where the output torque of the motor is not less than a preset second reference torque that is not lower than the preset first reference torque. In the power output apparatus of this arrangement, the first power transmission mechanism is favorably activated for the power transmission in the low torque region, whereas the second power transmission mechanism is favorably activated for the power transmission in the high torque region. The motor is thus operable in its adequate driving range.

In one preferable embodiment of the power output apparatus of the invention, the power transmission switchover module includes: a moving force application structure that applies a moving force to the rotating shaft in an opposite direction reverse to the specific direction; and a coupling-decoupling structure that couples the rotating shaft with the driveshaft in response to a motion of the rotating shaft in the specific direction and decouples the rotating shaft from the driveshaft in response to a motion of the rotating shaft in the opposite direction. In response to output of a relatively small torque from the motor, the moving force applied to the rotating shaft in the opposite direction by the moving force application structure causes the coupling-decoupling structure to couple the rotating shaft with the driveshaft. The first power transmission mechanism is then activated to transmit the output power of the motor to the driveshaft. In response to output of a relatively large torque from the motor, on the other hand, the moving force of the rotating shaft in the specific direction by the function of the magnetic field generated in the motor causes the coupling-decoupling structure to decouple the rotating shaft from the driveshaft. The second power transmission mechanism is then activated to transmit the output power of the motor to the driveshaft. In the power output apparatus of this arrangement, by simply varying the output torque of the motor, the power transmission pathway is readily switched over between the power transmission by the first power transmission mechanism and the power transmission by the second power transmission mechanism. The moving force application structure may be, for example, a spring that applies a pressing force to the rotating shaft in the opposite direction.

In another aspect of the power output apparatus of the invention, the first power transmission mechanism transmits the power from the rotating shaft to the driveshaft at a fixed gear ratio, and the second power transmission mechanism transmits the power from the rotating shaft to the driveshaft at a variable gear ratio. This arrangement enables the power transmission at the fixed gear ratio by the first power transmission mechanism, while enabling the power transmission at the variable gear ratio by the second power transmission mechanism. In this case, the power output apparatus may further has a control module that, in a coupling state of the rotating shaft with the driveshaft by the coupling-decoupling structure, controls the second power transmission mechanism to cause rotation of the driveshaft relative to rotation of the rotating shaft with the power transmission by the second power transmission structure to be in synchronism with the rotation of the driveshaft relative to the rotation of the rotating shaft with the power transmission by the first power transmission structure. The power output apparatus of this arrangement does not require separation of the second power transmission mechanism during the power transmission by the first power transmission mechanism. This arrangement thus ensures a smooth switchover of the power transmission pathway from the power transmission by the first power transmission mechanism to the power transmission by the second power transmission mechanism.

BEST MODES OF CARRYING OUT THE INVENTION

One mode of carrying out the invention is described below as a preferred embodiment with reference to the accompanied drawings.

Figure 1:
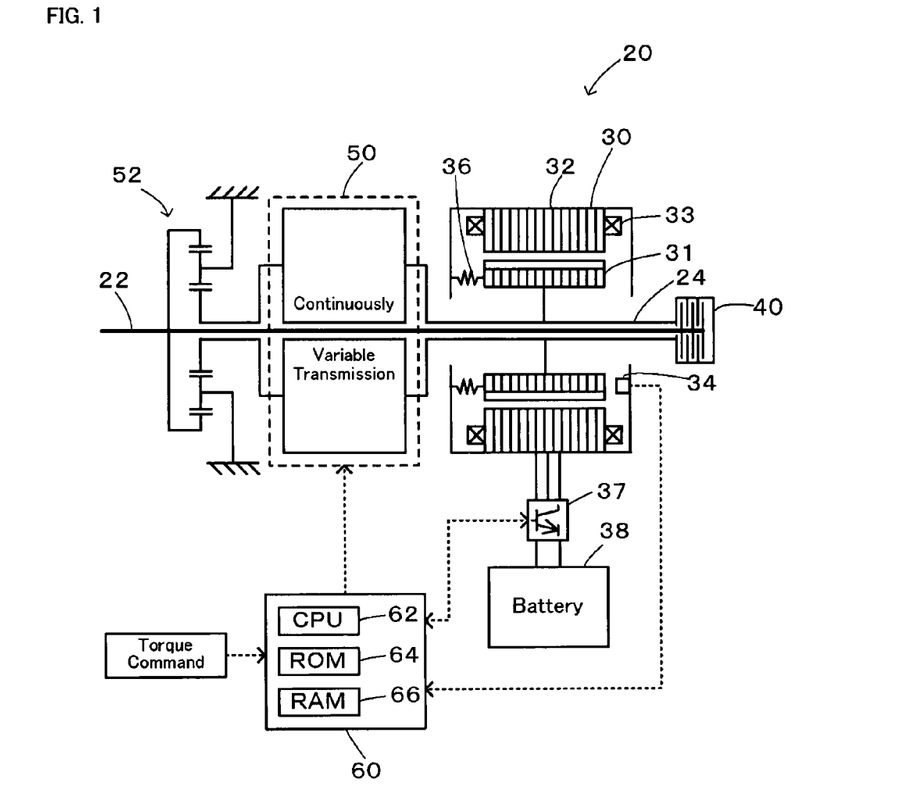
FIG. 1 schematically illustrates the structure of a driving device 20 in one embodiment of the invention.

FIG. 1 schematically illustrates the structure of a driving device 20 in one embodiment of the invention. As illustrated, the driving device 20 of the embodiment includes a motor 30 that is driven with a supply of electric power from a battery 38, a clutch 40 that couples and decouples a rotating shaft 24 or an output shaft of the motor 30 with and from a driveshaft 22, a continuously variable transmission 50 that has an input shaft connected with the rotating shaft 24, a gear mechanism 50 that is connected with an output shaft of the continuously variable transmission 50 and with the driveshaft 22, and an electronic control unit 60 that controls the operations of the whole driving device 20.

The motor 30 is a known synchronous motor generator and includes a rotor 31 that is connected to the rotating shaft 24 and has permanent magnets attached to its outer circumferential face, and a stator 32 that is arranged to surround the outer circumference of the rotor 31 across a small gap and has three-phase coils 33 wound thereon. The motor 30 is linked to the battery 38 via an inverter 37. In the structure of the embodiment, the rotating shaft 24 is arranged to be slightly movable leftward and rightward (in the drawing) in the axial direction. A spring 36 is attached to the rotor 31 of the motor 30 to apply a pressing force rightward (in the drawing). The rotating shaft 24 is thus pressed rightward (in the drawing) by the pressing force of the spring 36 applied via the rotor 31. Application of three-phase alternating currents to the three-phase coils 33 of the stator 32 generates a rotating magnetic field. In this state, the rotor 31 of the motor 30 produces a rotational torque of the ordinary motor and simultaneously functions as a solenoid to produce a thrust force in the axial direction of the rotating shaft 24. The thrust force is enhanced according to the intensity of the magnetic field produced on the stator 32. As mentioned above, the rotating shaft 24 is held to be slightly movable in the axial direction. In the state of application of the thrust force in a direction against the pressing force of the spring 36, the rotating shaft 24 is moved in the axial direction according to the intensity of the magnetic field produced on the stator 32. The intensity of the magnetic field on the stator 32 is proportional to the magnitude of the output torque from the motor 30. Namely the rotating shaft 24 is movable in the axial direction according to the magnitude of the output torque from the motor 30.

The clutch 40 includes multiple disks on its input side connecting with the rotating shaft 24 and multiple disks on its output side connecting with the driveshaft 22. The clutch 40 couples the rotating shaft 24 with the driveshaft 22 in the state where the rotating shaft 24 shifts rightward (in the drawing) by the pressing force of the spring 36 to apply a frictional force to the multiple disks on the input side and to the multiple disks on the output side. The clutch 40 decouples the rotating shaft 24 from the driveshaft 22 in the state where the rotating shaft 24 shifts leftward (in the drawing) against the pressing force of the spring 36 to release the frictional force applied to the multiple disks on the input side and the multiple disks on the output side.

The continuously variable transmission 50 may be a toroidal continuously variable transmission or a belt-type continuously variable transmission. The input shaft and the output shaft of the continuously variable transmission 50 are respectively linked with the rotating shaft 24 and with the driveshaft 22 via the gear mechanism 52.

The gear mechanism 52 may be, for example, a planetary gear unit. The gear ratio of the gear mechanism 52 is set to attain the total gear ratio of the continuously variable transmission 50 and the gear mechanism 52 equal to 1 at a maximum speed-increasing gear position of the continuously variable transmission 50. Namely the gear ratio is set to make the rotation speed of the rotating shaft 24 equal to the rotation speed of the driveshaft 22 at the maximum speed-increasing gear position. In the state of coupling the rotating shaft 24 with the driveshaft 22 by the clutch 40, at the maximum speed-increasing gear position of the continuously variable transmission 50, the torque generated by the motor 30 is output to the driveshaft 22 via the clutch 40.

The electronic control unit 60 is constructed as a microcomputer including a central processing unit or CPU 62, a ROM 64 for storage of processing programs, a RAM 66 for temporary storage of data, and input and output ports (not shown). The electronic control unit 60 inputs, via its input port, a rotational position of the rotor 31 in the motor 30 from a rotational position sensor 34, phase currents applied to the motor 30 from a current sensor (not shown) located inside the inverter 37, and a torque command or torque demand to be output from the motor 30. The electronic control unit 60 outputs, via its output port, a switching control signal to multiple switching elements included in the inverter 37 and a driving signal to an actuator (not shown) driven to change the gear ratio of the continuously variable transmission 50.

The driving device 20 of the above structure is driven to operate in the following manner. In response to a small torque command of the motor 30, a magnetic field of relatively low intensity is produced on the stator 32 and causes the rotor 31 to generate a small thrust force. In this state, the clutch 40 couples the rotating shaft 24 with the driveshaft 22 by the pressing force of the spring 36. The torque generated by the motor 30 under operation control of the electronic control unit 60 in response to a given torque command is accordingly transmitted to the driveshaft 22 via the clutch 40. In response to a large torque command of the motor 30, on the other hand, a magnetic field of relatively high intensity is produced on the stator 32 and causes the rotor 31 to generate a large thrust force. The large thrust force moves the rotating shaft 24 leftward (in the drawing) in its axial direction against the pressing force of the spring 36. The leftward motion of the rotating shaft 24 releases the coupling of the rotating shaft 24 with the driveshaft 22 by the clutch 40. The torque generated by the motor 30 under operation control of the electronic control unit 60 in response to a given torque command is accordingly transmitted to the driveshaft 22 via the continuously variable transmission 50 and the gear mechanism 52. A shift of the gear ratio of the continuously variable transmission 50 to a speed-decreasing gear position amplifies the torque generated by the motor 30 and transmitted to the driveshaft 22.

Figure 2:
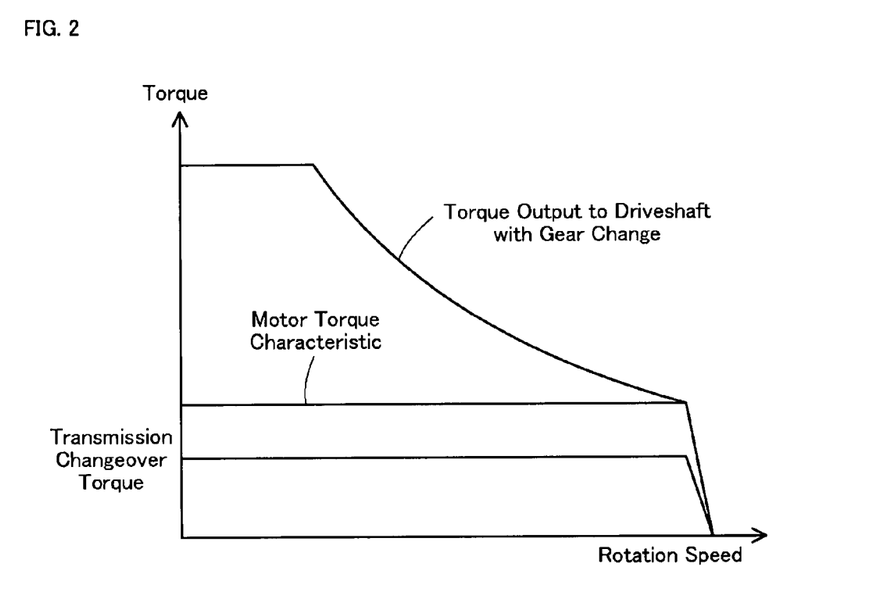
FIG. 2 is a graph showing a torque characteristic curve of the motor 30 and a relation between a torque output to the driveshaft 22 with a gear change of the continuously variable transmission 50 and a transmission changeover torque of the clutch 40.

FIG. 2 is a graph showing a torque characteristic curve of the motor 30 and a relation between a torque output to the driveshaft 22 with a gear change of the continuously variable transmission 50 and a transmission changeover torque of the clutch 40. The design specification of the spring 36 for applying the pressing force is determined to cause a decoupling torque for releasing the coupling state of the clutch 40 by the thrust force of the rotor 31 to be smaller than a maximum possible torque output from the motor 30. The decoupling torque is, for example, half the maximum possible torque output from the motor 30 and is hereafter referred to as the 'transmission changeover torque'. Under the condition of a torque command of the motor 30 that is less than the transmission changeover torque, the output torque of the motor 30 is transmitted to the driveshaft 22 in the coupling state of the clutch 40 that couples the rotating shaft 24 with the driveshaft 22. Under the condition of a torque command of the motor 30 that is not less than the transmission changeover torque, on the other hand, the output torque of the motor 30 is transmitted to the driveshaft 22 with a gear change of the continuously variable transmission 50 in the decoupling state of the clutch 40 that decouples the rotating shaft 24 from the driveshaft 22. In response to a high torque demand to be output to the driveshaft 22, the motor 30 is driven and controlled to have a torque command of not less than the transmission changeover torque. The gear ratio of the continuously variable transmission 50 is changed to ensure the output torque of the motor 30 satisfying a required torque demand. Under the condition of the torque command of the motor 30 that is less than the transmission changeover torque, the clutch 40 couples the rotating shaft 24 with the driveshaft 22 as mentioned previously. In this state, the gear ratio of the continuously variable transmission 50 is changed to the maximum speed-increasing gear position. At the maximum speed-increasing gear position set in the continuously variable transmission 50, the torque transmission via the continuously variable transmission 50 and the gear mechanism 52 makes the rotation speed of the rotating shaft 24 equal to the rotation speed of the driveshaft 22.

As described above, in the driving device 20 of the embodiment, in response to a torque command of the motor 30 that is less than the transmission changeover torque, the output torque of the motor 30 is transmitted to the driveshaft 22 via the clutch 40 in the coupling state that couples the rotating shaft 24 or the output shaft of the motor 30 with the driveshaft 22. In response to a torque command of the motor 30 that is not less than the transmission changeover torque, on the other hand, the output torque of the motor 30 is transmitted to the driveshaft 22 with a gear change of the continuously variable transmission 50 in the decoupling state of the clutch 40 that decouples the rotating shaft 24 from the driveshaft 22. By simply varying the magnitude of the output torque of the motor 30, the state of the clutch 40 is automatically changed between the coupling state of coupling the rotating shaft 24 with the driveshaft 22 and the decoupling state of decoupling the rotating shaft 24 from the driveshaft 22. This automatic coupling/decoupling change switches over the torque transmission pathway of the output torque of the motor 30 between transmission to the driveshaft 22 via the clutch 40 and transmission to the driveshaft 22 via the continuously variable transmission 50. The driving device 20 of this simple structure attains the switchover of the torque transmission pathway from the motor 30 to the driveshaft 22 without any complicated control.

Figure 3:
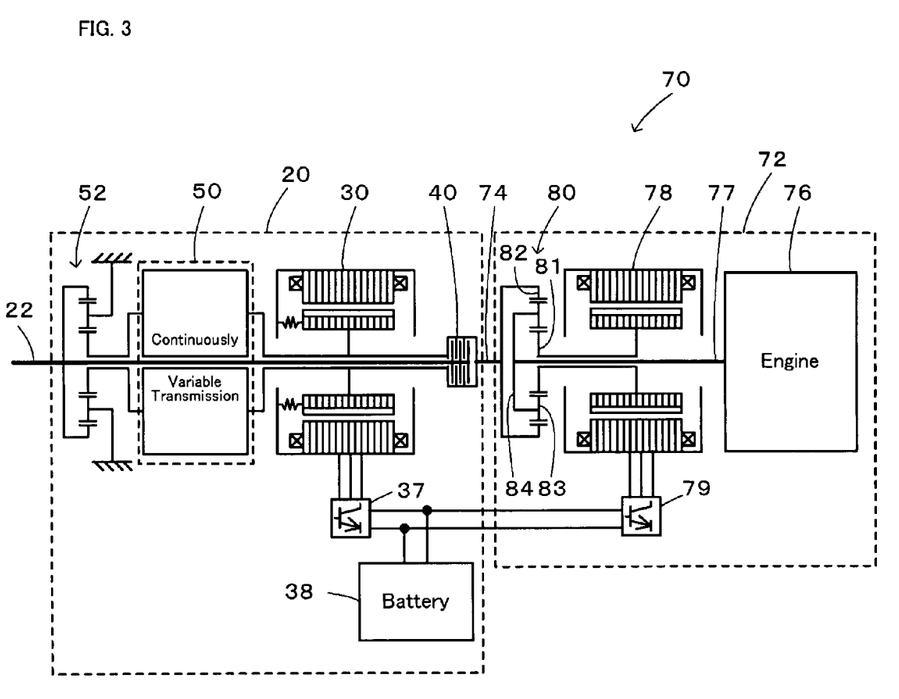
FIG. 3 schematically illustrates the structure of the power output apparatus 70 in the embodiment.

A power output apparatus 70 is described below as one embodiment of the invention. FIG. 3 schematically illustrates the structure of the power output apparatus 70 in the embodiment of the invention. As illustrated, the power output apparatus 70 of the embodiment includes the driving device 20 of the embodiment described above and a power system 72 connected to the rotating shaft 24 of the driving device 20 via its output shaft 74. The power system 72 includes an engine 76 that consumes a hydrocarbon fuel, such as gasoline or light oil, to output power, a planetary gear mechanism 80 that has a ring gear 82 connected to the output shaft 74 and a carrier 84 connected to a crankshaft 77 of the engine 76 and arranged to couple multiple pinion gears 83, and a motor 78 that inputs and output power from and to a sun gear 81 of the planetary gear mechanism 80 and is connected to the battery 38 via an inverter 79.

In the power output apparatus 70 of this structure, the power output from the engine 76 is integrated with the power input into or output from the motor 78 and is transmitted to the rotating shaft 24. The output power of the rotating shaft 24 is transmitted to the driveshaft 22 with the switchover of the torque transmission pathway to the driveshaft 22 based on the magnitude of the output torque of the motor 30. In the coupling state of the clutch 40 that couples the rotating shaft 24 with the driveshaft 22, the sum of the torque output from the motor 30 and the torque output from the power output apparatus 70 to the output shaft 74 is directly transmitted to the driveshaft 22. In the decoupling state of the clutch 40 that decouples the rotating shaft 24 from the driveshaft 22, on the other hand, the sum of the torque output from the motor 30 and the torque output from the power output apparatus 70 to the output shaft 74 is transmitted to the driveshaft 22 with a gear change of the continuously variable transmission 50.

As described above, in the power output apparatus 70 of the embodiment, in response to a torque command of the motor 30 that is less than the transmission changeover torque, the torque output from the power system 72 to the output shaft 74 is integrated with the output torque of the motor 30 and is directly transmitted to the driveshaft 22. In response to a torque command of the motor 30 that is not less than the transmission changeover torque, on the other hand, the torque output from the power system 72 to the output shaft 74 is integrated with the output torque of the motor 30 and is transmitted to the driveshaft 22 with a gear change of the continuously variable transmission 50. By simply varying the magnitude of the output torque of the motor 30, the state of the clutch 40 is automatically changed between the coupling state of coupling the rotating shaft 24 with the driveshaft 22 and the decoupling state of decoupling the rotating shaft 24 from the driveshaft 22. This automatic coupling/decoupling change switches over the torque transmission pathway of the sum of the torque output from the power system 72 to the output shaft 74 and the output torque of the motor 30 between direct transmission to the driveshaft 22 and transmission to the driveshaft 22 via the continuously variable transmission 50. The power output apparatus 70 of this simple structure attains the switchover of the torque transmission pathway from the power system 72 and the motor 30 to the driveshaft 22 without any complicated control.

In the driving device 20 of the embodiment or the driving device 20 included in the power output apparatus 70 of the embodiment, the rotating shaft 24 receives the thrust force based on the magnetic field of the stator 32 to move leftward (in the drawing of FIG. 1). The direction of the thrust force is, however, not restrictive to this direction, but the rotating shaft 24 may receive the thrust force to move rightward (in the drawing of FIG. 1). In the latter case, the spring 36 for pressing the rotor 31 is arranged to release the coupling state of the clutch 40 that couples the rotating shaft 24 with the driveshaft 22 with a rightward shift of the rotating shaft 24 by the thrust force.

In the driving device 20 of the embodiment or the driving device 20 included in the power output apparatus 70 of the embodiment, in the coupling state of the clutch 40 that couples the rotating shaft 24 with the driveshaft 22, at the maximum speed-increasing gear position set in the continuously variable transmission 50, the torque transmission via the continuously variable transmission 50 and the gear mechanism 52 makes the rotation speed of the rotating shaft 24 equal to the rotation speed of the driveshaft 22. This gear position is, however, not essential. The requirement to be satisfied is that the torque transmission via the continuously variable transmission 50 and the gear mechanism 52 makes the rotation speed of the rotating shaft 24 equal to the rotation speed of the driveshaft 22 in the coupling state of the clutch 40 that couples the rotating shaft 24 with the driveshaft 22. At a different gear position from the maximum speed-increasing gear position set in the continuously variable transmission 50, the torque transmission via the continuously variable transmission 50 and the gear mechanism 52 may make the rotation speed of the rotating shaft 24 equal to the rotation speed of the driveshaft 22.

In the driving device 20 of the embodiment or the driving device 20 included in the power output apparatus 70 of the embodiment, the gear mechanism 52 is interposed between the continuously variable transmission 50 and the driveshaft 22. In one modified structure, the gear mechanism 52 may be omitted, and the continuously variable transmission 50 may be linked directly with the driveshaft 22.

Figure 4:
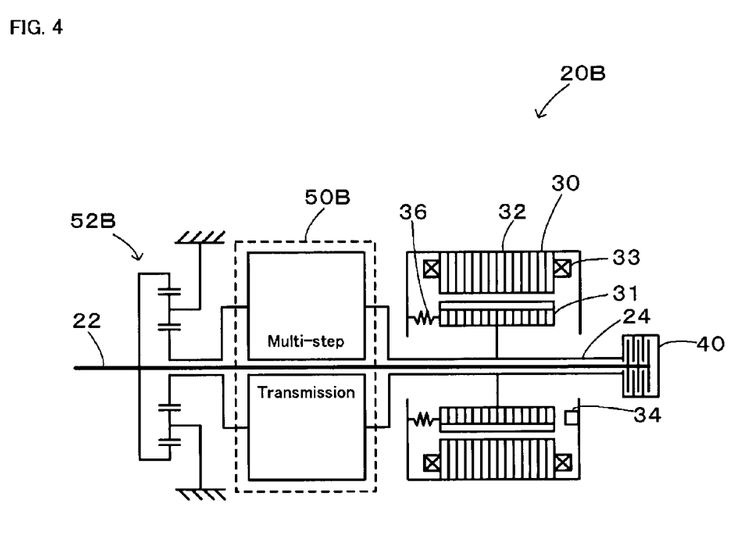
FIG. 4 schematically illustrates the structure of a driving device 20B of one modified structure.

In the driving device 20 of the embodiment or the driving device 20 included in the power output apparatus 70 of the embodiment, the continuously variable transmission 50, for example, the toroidal continuously variable transmission or the belt-type continuously variable transmission, is connected to the rotating shaft 24 or the output shaft of the motor 30. The continuously variable transmission 50 may be replaced by another type of stepless transmission or even by a multi-step transmission 50B as in a driving device 20B of a modified structure shown in FIG. 4. In the driving device 20B of this modified structure, the gear ratio of a gear mechanism 52B linked with the multi-step transmission 50B is set to make the rotation speed of the rotating shaft 24 equal to the rotation speed of the driveshaft 22 by torque transmission via the multi-step transmission 50B and the gear mechanism 52B at a maximum speed-increasing gear position or at another gear position set in the multi-step transmission 50B in the coupling state of the clutch 40 that couples the rotating shaft 24 with the driveshaft 22.

Figure 5:
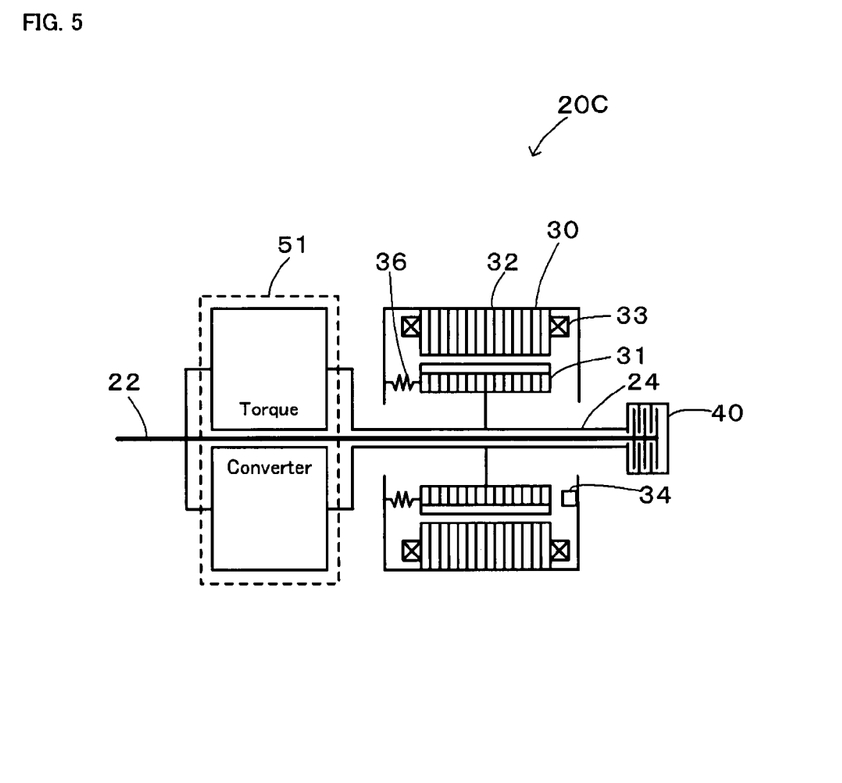
FIG. 5 schematically illustrates the structure of a driving device 20C of another modified structure.
Figure 6:
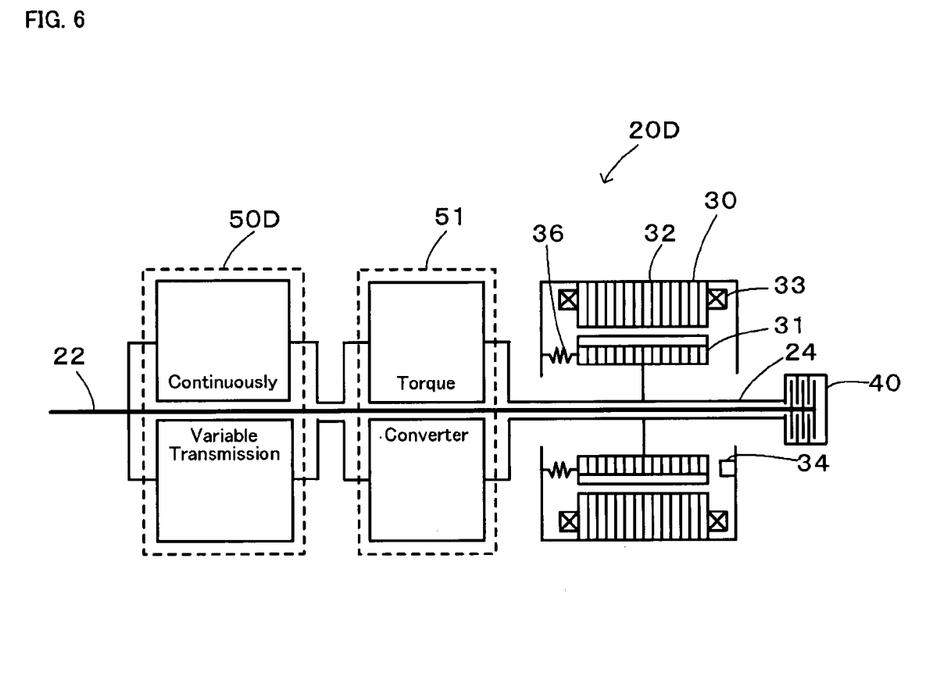
FIG. 6 schematically illustrates the structure of a driving device 20D of another modified structure.
Figure 7:
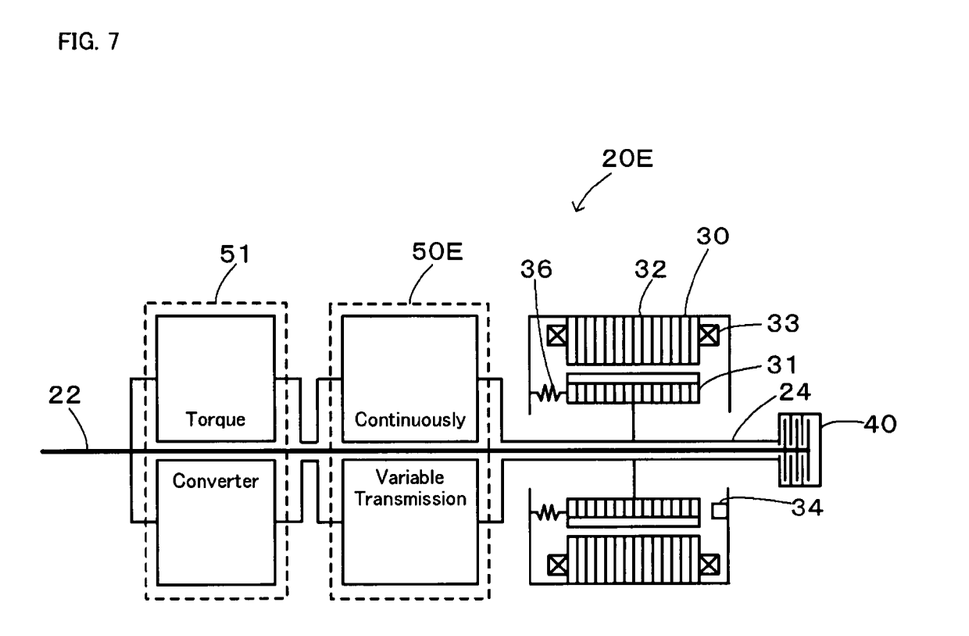
FIG. 7 schematically illustrates the structure of a driving device 20E of another modified structure.

In the driving device 20 of the embodiment or the driving device 20 included in the power output apparatus 70 of the embodiment, the continuously variable transmission 50 is connected to the rotating shaft 24 or the output shaft of the motor 30. The driving device may be modified to have another structure, as long as the rotation speed of the rotating shaft 24 is made to be equal to the rotation speed of the driveshaft 22 in the coupling state of the clutch 40 that couples the rotating shaft 24 with the driveshaft 22. For example, as in a driving device 20C of one modified structure shown in FIG. 5, a torque converter 51, in place of the continuously variable transmission 50, may be connected to the rotating shaft 24. In this modified structure, the gear mechanism 52 may be omitted, because of the slipping function of the torque converter 51. In this application with the torque converter 51, a continuously variable transmission 50D may additionally be provided between the torque converter 51 and the driveshaft 22 as in a driving device 20D shown in FIG. 6. A continuously variable transmission 50E may alternatively be provided between the motor 30 and the torque converter 51 as in a driving device 20E shown in FIG. 7.

The embodiments discussed above are to be considered in all aspects as illustrative and not restrictive. There may be many modifications, changes, and alterations without departing from the scope or spirit of the main characteristics of the present invention.

INDUSTRIAL APPLICABILITY

The technique of the invention is preferably applicable to the manufacturing industries of driving devices and power output apparatuses.

The invention claimed is:

1. A driving device that outputs driving force to a driveshaft, the driving device comprising:
   a motor including a stator that has a coil wound thereon, and a rotor that is attached to a rotating shaft pivotally supported to be movable in an axial direction and rotates with a moving force of moving the rotating shaft in one specific direction by function of a magnetic field generated by application of electric current onto the coil of the stator;
   a first power transmission mechanism that transmits power from the rotating shaft to the driveshaft;
   a second power transmission mechanism that is different from the first power transmission mechanism and transmits power from the rotating shaft to the driveshaft; and
   a power transmission switchover module that, in response to a motion of the rotating shaft in the axial direction, switches over a power transmission pathway between the power transmission by the first power transmission mechanism and the power transmission by the second power transmission mechanism.

2. The driving device in accordance with claim 1, wherein the power transmission switchover module switches over the power transmission pathway to the power transmission by the first power transmission mechanism in a low torque region where an output torque of the motor is less than a preset first reference torque, and
   the power transmission switchover module switches over the power transmission pathway to the power transmission by the second power transmission mechanism in a high torque region where the output torque of the motor is not less than a preset second reference torque that is not lower than the preset first reference torque.

3. The driving device in accordance with claim 1, wherein the power transmission switchover module includes: a moving force application structure that applies a moving force to the rotating shaft in an opposite direction reverse to the specific direction; and a coupling-decoupling structure that couples the rotating shaft with the driveshaft in response to a motion of the rotating shaft in the specific direction and decouples the rotating shaft from the driveshaft in response to a motion of the rotating shaft in the opposite direction.

4. The driving device in accordance with claim 3, wherein the moving force application structure is a spring that applies a pressing force to the rotating shaft in the opposite direction.

5. The driving device in accordance with claim 1, wherein the first power transmission mechanism transmits the power from the rotating shaft to the driveshaft at a fixed gear ratio, and
   the second power transmission mechanism transmits the power from the rotating shaft to the driveshaft at a variable gear ratio.

6. The driving device in accordance with claim 5, wherein the second power transmission mechanism has a continuously variable transmission.

7. The driving device in accordance with claim 5, wherein the second power transmission mechanism has a multi-step transmission.

8. The driving device in accordance with claim 5, wherein the second power transmission mechanism has a torque converter.

9. The driving device in accordance with claim 8, wherein the second power transmission mechanism has a transmission located between the torque converter and the driveshaft.

10. The driving device in accordance with claim 5, the driving device further having:
    a coupling-decoupling structure that couples the rotating shaft with the driveshaft in response to a motion of the rotating shaft in the specific direction and decouples the rotating shaft from the driveshaft in response to a motion of the rotating shaft in the opposite direction; and
    a control module that, in a coupling state of the rotating shaft with the driveshaft by the coupling-decoupling structure, controls the second power transmission mechanism to cause rotation of the driveshaft relative to rotation of the rotating shaft with the power transmission by the second power transmission structure to be in synchronism with the rotation of the driveshaft relative to the rotation of the rotating shaft with the power transmission by the first power transmission structure.

11. A power output apparatus that outputs power to a driveshaft, the power output apparatus comprising:
    a motor including a stator that has a coil wound thereon, and a rotor that is attached to a rotating shaft pivotally supported to be movable in an axial direction and rotates with a moving force of moving the rotating shaft in one specific direction by function of a magnetic field generated by application of electric current onto the coil of the stator;
    a first power transmission mechanism that transmits power from the rotating shaft to the driveshaft;
    a second power transmission mechanism that is different from the first power transmission mechanism and transmits power from the rotating shaft to the driveshaft;
    a power transmission switchover module that, in response to a motion of the rotating shaft in the axial direction, switches over a power transmission pathway between the power transmission by the first power transmission mechanism and the power transmission by the second power transmission mechanism;
    an internal combustion engine; and
    an electric power mechanical power input output assembly that is connected to an output shaft of the internal combustion engine and to the driveshaft and outputs at least part of power generated by the internal combustion engine to the driveshaft through input and output of electric power and mechanical power.

12. The power output apparatus in accordance with claim 11, wherein the power transmission switchover module switches over the power transmission pathway to the power transmission by the first power transmission mechanism in a low torque region where an output torque of the motor is less than a preset first reference torque, and
    the power transmission switchover module switches over the power transmission pathway to the power transmission by the second power transmission mechanism in a high torque region where the output torque of the motor is not less than a preset second reference torque that is not lower than the preset first reference torque.

13. The power output apparatus in accordance with claim 11, wherein the power transmission switchover module includes: a moving force application structure that applies a moving force to the rotating shaft in an opposite direction reverse to the specific direction; and a coupling-decoupling structure that couples the rotating shaft with the driveshaft in response to a motion of the rotating shaft in the specific direction and decouples the rotating shaft from the driveshaft in response to a motion of the rotating shaft in the opposite direction.

14. The power output apparatus in accordance with claim 11, wherein the first power transmission mechanism transmits the power from the rotating shaft to the driveshaft at a fixed gear ratio, and the second power transmission mechanism transmits the power from the rotating shaft to the driveshaft at a variable gear ratio.

15. The power output apparatus in accordance with claim 14, the power output apparatus further having:

a coupling-decoupling structure that couples the rotating shaft with the driveshaft in response to a motion of the rotating shaft in the specific direction and decouples the rotating shaft from the driveshaft in response to a motion of the rotating shaft in the opposite direction; and a control module that, in a coupling state of the rotating shaft with the driveshaft by the coupling-decoupling structure, controls the second power transmission mechanism to cause rotation of the driveshaft relative to rotation of the rotating shaft with the power transmission by the second power transmission structure to be in synchronism with the rotation of the driveshaft relative to the rotation of the rotating shaft with the power transmission by the first power transmission structure.

\* \* \* \* \*